Nov. 18, 1969  L. A. McCUTCHEON  3,478,446
EDUCATIONAL AND RECREATIONAL LESSON AID
PIXX GAMES WITH PEGBOARDS
Filed April 28, 1967  3 Sheets-Sheet 1
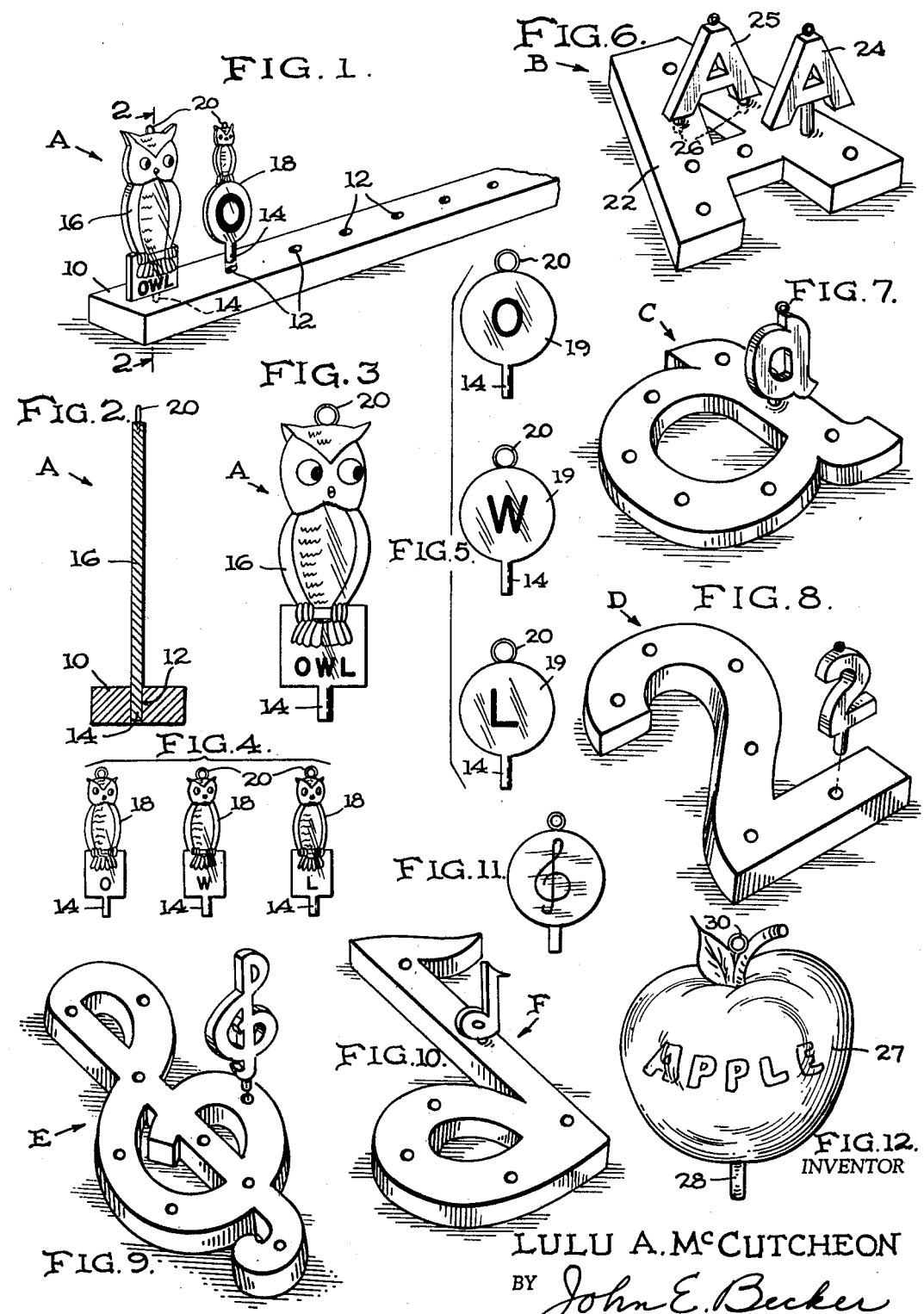
LULU A. McCUTCHEON
BY John E. Becker
ATTORNEY Nov. 18, 1969     L. A. McCUTCHEON     3,478,446
EDUCATIONAL AND RECREATIONAL LESSON AID
PIXX GAMES WITH PEGBOARDS
Filed April 28, 1967     3 Sheets-Sheet 2
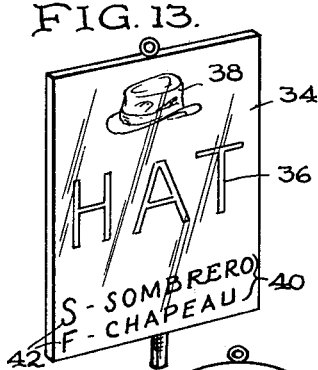
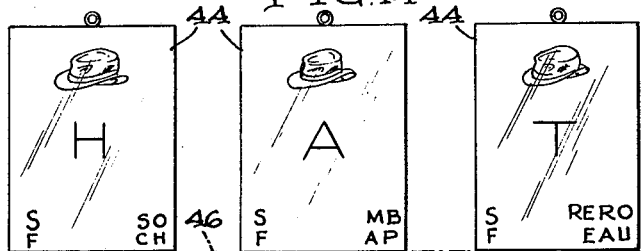
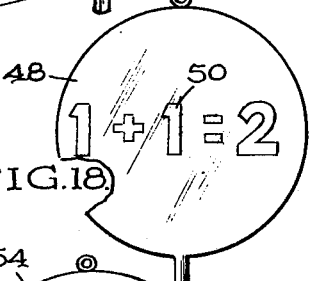
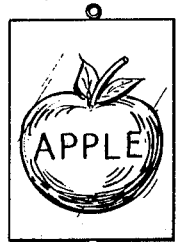
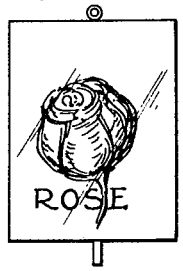
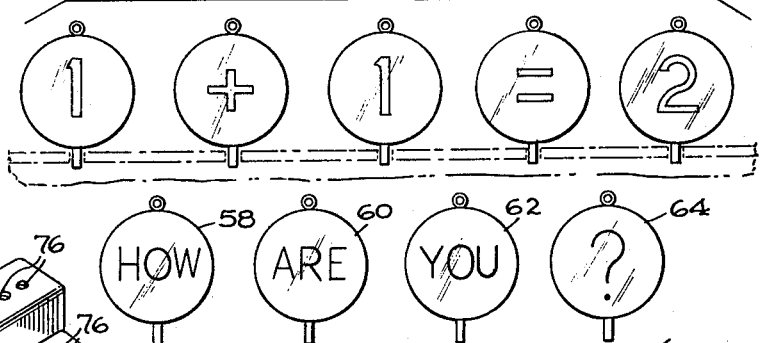
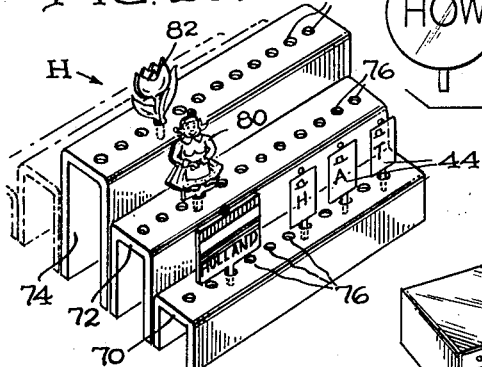
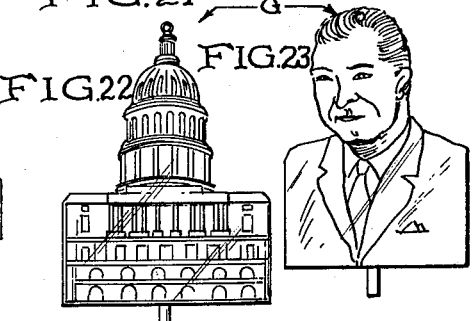
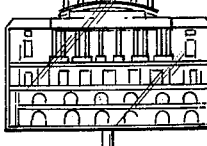
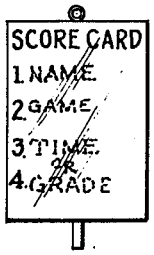
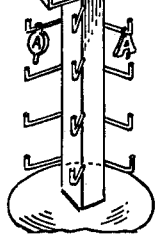
INVENTOR
LULU A. McCUTCHEON
BY John E. Becker
ATTORNEY Nov. 18, 1969   L. A. McCUTCHEON   3,478,446
EDUCATIONAL AND RECREATIONAL LESSON AID
PIXX GAMES WITH PEGBOARDS
Filed April 28, 1967   3 Sheets-Sheet 3

*INVENTOR*
LULU A. McCUTCHEON
BY *John E. Becker*
ATTORNEY

United States Patent Office 3,478,446
Patented Nov. 18, 1969

3,478,446
EDUCATIONAL AND RECREATIONAL LESSON AID PIXX GAMES WITH PEGBOARDS
Lulu A. McCutcheon, Oakland, Calif.
(General Delivery, Washington, D.C.)
Filed Apr. 28, 1967, Ser. No. 634,564
Int. Cl. A68h 33/00; G09b 1/06
U.S. Cl. 35—73
12 Claims

ABSTRACT OF THE DISCLOSURE

This invention is directed to educational and recreational lesson aid material which utilizes both mental and physical processes. The games are particularly useful in imparting information and instruction embracing the three R's and many other subjects to novice, retarded, deaf and other young and old people, as well as being susceptible to successful social enjoyment by players of all ages. The game presents a large and distinctive variety of combination pictorial, digital and alphabetical letters, symbols or characters and the like in various design and/or card form adaptable for both visual study and physical manipulation in conjunction with a variety of pegboard or other supports, to develop new abilities and desires on the part of the users to learn the various concepts herein.

BACKGROUND OF THE INVENTION

The present invention relates to educational and recreational teaching lesson-aids and picture game material for the practical teaching to novice students, the physically handicapped (deaf) and/or mentally retarded children, the subjects of reading, writing, geography, etc., comprising the alphabet, numbers, and vocabulary in one or more languages. The lesson aids and picture games, the latter hereinafter referred to as Pixx games, comprise in one embodiment the related use of a plurality of individual guide cards, design cards and preferably also score cards in conjunction with one of a plurality of various supporting or base peg board members upon which the various cards are selectively and sequentially displayed during the play and learning use of the apparatus. Each guide card serves as a master teaching card having a configuration corresponding to and/or having a colorful design provided on the face side of a plain rectangular or circular card representative of a given article, animal, fowl or other symbol and its corresponding name which is a suitable subject to be learned. On the back of the guide card there is a brief definition and history of the subject, article or symbol displayed on the face side. The design cards are used after the guide cards have been preliminarily displayed for an initial study period. These design cards are in various forms, preferably being the same as that of the corresponding guide cards with which it is to be used, but perhaps of a smaller relative scale and having the individual spelling letters depicted on each of said design cards, with only as many different letter-design cards as is necessary to complete the correct spelling of that subject or symbol on the guide cards. The design cards, having pegs thereon, are manipulated by the user, being hand picked from a supply store of the various letter and number design cards available during play, and placed upon a peg board support. The individual score cards are used last to record the individual's name, correctness and time for completing the play or learning of a particular facet of this educational apparatus.

Another embodiment utilizes a plurality of mix and match guide and design cards whereby illustrations of a significant object or symbol are presented on the individual guide or master card, and related objects or symbols are presented on another set of design or work cards whereby it is the object of this facet of the lesson to properly match the corresponding symbol cards. For example, a picture of the Vatican or of the White House on the guide cards should be correspondingly matched with a picture of the Pope or of the United States President, respectively, as provided on corresponding design or work cards.

The educational and recreational teaching and lesson aids and so-called Pixx game material of this invention incorporates both mental and physical processes on the part of the players. While the games are particularly useful in the instruction of reading, writing, arithmetic and many other subjects for the novice student, the retarded, deaf, and other young students, with little or no supervision, it is also capable of successful and enjoyable social use by players of all ages, and presents a large variety of lesson aids which tend to develop new abilities and a desire on the part of the players to continue learning new educational concepts as well.

Experts on elementary teaching generally agree that young pre-schoolers or students going to school for the first time must be given the desirable impression in their first contacts with formal lessons or learning that schooling is just as pleasant as playing at home or in his yard or garden.

The alphabet, numerals, geography lessons and the like, as prepared and presented on distinctively illustrated and colorfully prepared guide, design and score cards of this invention are intended to achieve this purpose.

A primary object is to provide an improved lesson-aid and recreational game for pre-schoolers, slow learners, the mentally and physically retarded, which comprises in combination with support members a plurality of indicia bearing guide cards displaying a lesson to be learned or a thought to be conveyed, and a plurality of corresponding indicia bearing design or playing cards selectively hand manipulable from a variety of similar design cards picked from a supply bank, the design cards being studiously compared, both visually and physically, to the master card design, whereupon the student's spelling or reading senses, by repetitious selecting and matching of the corresponding guide and design cards, eventually become stimulated to the extent that he is soon able to memorize or comprehend the correct answer or a feasible thinking process which will enable him to arrive at a reasonable comparison or answer.

Another primary object is to provide an improved teaching aid according to the preceding object, which material may be used in conjunction with a display easel or table top supporting means having apertured display panels to receive pegged style design cards or symbols embodied during playing use thereof with said game playing members preferably remaining fixed once positioned until the lesson is over.

A further object is to provide an improved teaching aid of the character described, involving the mental processes of spelling, mathematics, reading and the like, whose components are made of a lightweight, durable, washable plastic or similar material which lends itself to fabrication in a variety of bright colors and shapes thereby being more attractive by stimulating the interest particularly of the retarded, deaf or slow learning groups of children.

Still another object is to provide an improved lesson aid according to the preceding objectives which by the inherent use of the senses of touch and seeing, and the attendant muscular action of reaching for, picking up and placing of the desired pegged design cards in a pegboard support to match symbols or spell out words, etc., provides ultimately for both mental and muscular coordination which is so vital to their growth development. Ultimately the student, by the continued drills, finds the lesson aids become perpetuated in his memory whereby the master or guide card can be dispensed with and he has permanently acquired an important facet of knowledge. It is well known that the more senses employed in acquiring an item of knowledge, the more readily will it be comprehended and retained.

Additional objects of the invention are to provide lesson-aid including a plurality of various support structures, preferably of the pegboard type, for the support of a large variety of interchangeable indicia-bearing card or symbol members, some serving as a central supply bank, and others as the work table upon which the card or symbol members may be manipulatively displayed attendant with the mental processes of solving or learning the particular subject indicia displayed with or without the guide cards and support being within the vision of the player, will become apparent from the following detailed description of the invention, taken in conjunction with the accompanying illustrative drawings.

Figure description

FIG. 1 is a perspective view of one form of lesson aid in accordance with the present invention depicting a guide card and one design card in the process of being assembled with a pegboard base;

FIG. 2 is an enlarged cross-sectional detail view as taken on line 2—2 of FIG. 1 through a guide card having a peg mounted in the pegboard base;

FIG. 3 is an enlarged front elevational detail view of the guide card of FIGS. 1 and 2;

FIG. 4 is a composite front elevational view of a plurality of design cards for complementary use with a guide card and base of FIG. 1;

FIG. 5 is another composite front elevation view of a plurality of modified design cards for complementary use with the guide card and base of FIG. 1;

Figure 26:
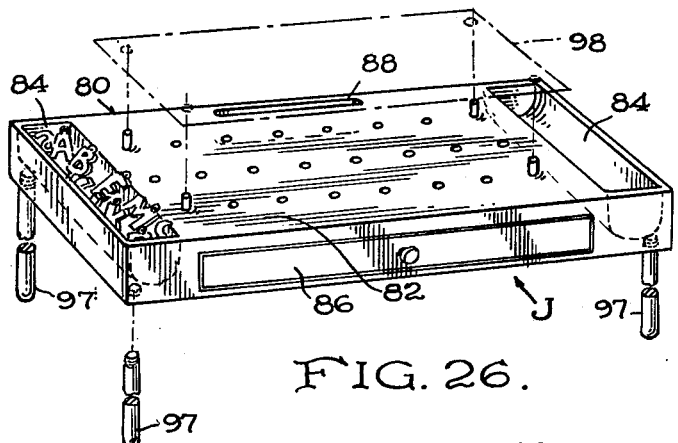
Figure 29:
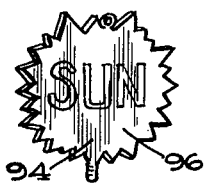
Figure 28:
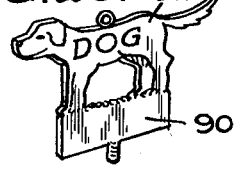
Figure 27:
Figure 31:
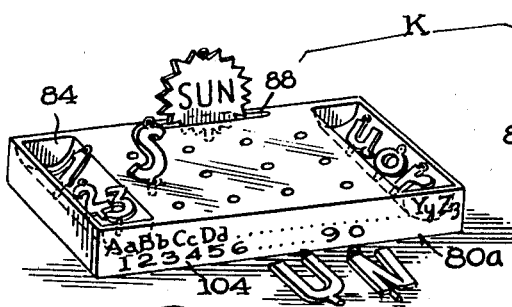
Figure 30:
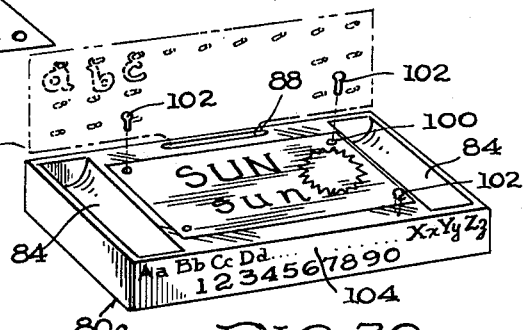
Figure 33:
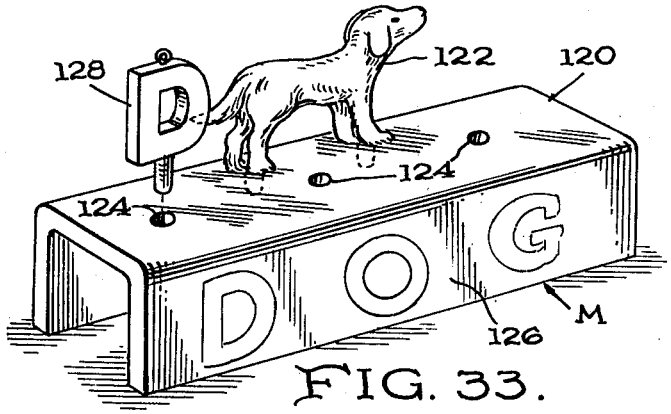
Figure 32:
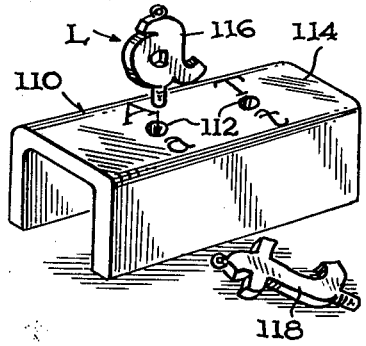

FIGS. 6–10 inclusive are perspective views of modified forms of pegboard bases together with corresponding forms of pegged design cards or cutouts used therewith;

FIG. 11 is a front elevation detail view of a design card having a musical staff symbol depicted thereon;

FIG. 12 is a representative of a perspective view of a three dimensional object such as an apple which, by having the name provided across the face thereof as shown serves as a guide card or lesson aid means which is readily adaptable for use with an appropriate peg base or the like;

FIG. 13 is a perspective view of yet another guide card having an object and its associated word both illustrated by appropriate art work and by spelling in a plurality of different languages;

FIG. 14 is a composite front elevational view of the appropriate plurality of corresponding design or spelling playing cards as would be used by the player during use of the game material thereof;

FIGS. 15, 16, and 17 are further illustrations of a variety of different educational subjects as prepared for use on guide cards;

FIG. 18 is a front elevational detail view of an arithmetic problem design card;

FIG. 19 is a composite front elevational view of the plurality of design cards provided with a peg base necessary for the copying of the mathematical problem presented on the guide card of FIG. 18;

FIGS. 20 and 21 are views similar to FIGS. 18 and 19 but relating to a question rather than a mathematical problem;

FIGS. 22 and 23 are representations of a pair of further modified lesson aids, wherein a well-known geographical location is depicted on one guide card, such as the White House in FIG. 22, and a well known person, such as the President of the United States is represented on the design card of FIG. 23 which is to be matched therewith;

FIG. 24 is a perspective composite view of another embodiment of the lesson aid game material of this invention wherein a plurality of pegboard supports are displayed in stepped formation as shown including a plurality of related guide and/or design cards displayed therewith;

FIG. 25 is a perspective detail view on a reduced scale of one form of component supply or storage facility adaptable to both store and display on hook or peg means, the so-called design cards thereon, the latter of which are hand-manipulable playing and spelling cards having various size ring means to cooperate with said hook means;

FIG. 26 is a perspective view of a modified peg board support and storage table in accordance with the invention;

FIG. 27 is a detail perspective view of a teaching lesson aid panel for use with the support table of FIG. 26;

FIGS. 28 and 29 are perspective front views of various guide cards particularly usable with the table of FIG. 26;

FIG. 30 is a perspective view of a slightly modified table top peg board, similar to that of FIG. 26, showing a lesson-aid panel pegged thereto;

FIG. 31 is a perspective view of the peg board of FIG. 30 with the lesson-aid panel removed and a lesson-aid guide card shown mounted at one margin thereof;

FIG. 32 is a detail perspective view of a modified peg board base support similar to those shown in FIG. 24, but designed for teaching only two letter words;

FIG. 33 is an enlarged detail perspective view similar to FIG. 32 but designed for teaching only three letter words and having mounted therewith either integrally or removably a three dimensional statuette serving as part of the guide object being taught; and FIG. 34 is an elevation of one form of score card.

Detailed specification

In the drawings, wherein for the purpose of illustration there are shown several examples of the many various forms of the invention, similar reference characters designate corresponding parts throughout the several views, the letter A designates generally the game material depicted in FIG. 1; B the game material depicted in FIG. 6; C the game apparatus of FIG. 7; D that of FIG. 8; E that of FIG. 9; F that of FIG. 10; G the matching indicia-bearing cards of FIGS. 22 and 23; H that of FIG. 24; J the pegboard table support of FIG. 26; K the game material generally as depicted in FIGS. 30 and 31; L that of FIG. 32 and that of FIG. 33.

Referring specifically to the embodiments shown in FIGS. 1–5 inclusive, the game material A comprises an elongated support base member 10 having a plurality of peg receiving apertures 12 adapted to receive the peg 14 which is preferably integrally formed in a depending manner from the lower portions of both the guide cards 16 and the design cards 18. Each of the guide cards serves as a master or teaching card of a particular object and words, the one illustrated herein having a configuration of an owl and having the name "OWL" depicted at some convenient place thereon such as the base portion. The guide cards have a brief definition and history on the back side of the particular subject, article or symbol displayed on the front side thereof.

The design cards 18 may be of the same general configuration as the guide cards, but preferably on a somewhat smaller scale, such as those shown in FIG. 4. Each design card is provided on its face with the particular letter of the alphabet necessary to complete the spelling of the items, and for the "OWL" example chosen there are three design or letter cards "O," "W," and "L." The particular design card 18 shown being assembled with the stand in FIG. 1 is of a slightly different form having a generally circular main or base portion within which the letters are placed, as compared with a generally rectangular portion shown in those of FIG. 4. The game apparatus of this invention includes game pieces in the form of guide cards 16 and design cards 18, each of which are preferably provided with a ring 20 or aperture to facilitate hanging said items on a pegboard display easel of the type shown in my U.S. Patent No. 3,263,347 or storage rack, such as shown in FIG. 25, from which said items are studied and selected during playing use thereof.

FIG. 5 is a composite view of a plurality of modified "O," "W," and "L" design cards designated 19, which generally serve as advanced forms of the cards. It is desirable to have the student ultimately progress to learning the spelling of the subject article without having the design configuration embodied with the letter cards which he selects from a central supply store or rack. Accordingly, the letter cards 19 omit the said design configuration but retain the peg 14 and ring 20 for the same preceding reasons.

The use of this lesson aid or so-called Pixx Game is obvious from the foregoing, but will be briefly reviewed. The teacher in charge of the students, or the students themselves, with little or no supervision, may select a guide card 16 having a particular subject matter to be learned and places it in the apertured base support 10, whereupon the information on the back side is read to the other students and the spelling of its name on the front side is studied in relation to its pictorial representation. The students subsequently study the display rack or storage panel upon which the design or letter cards are kept and choose the corresponding design cards therefrom to enable them to spell out the word by physically manipulating or placing said letter cards in the correct sequence beside or near the master or guide card 16.

Referring to FIG. 6, the game or lesson aid represented by B comprises a pegboard base support member 22 in the shape of a capital letter of the alphabet, the capital "A" being illustrated herein. Preferably smaller scaled letter cards 24 are provided for selection from a central supply by the student, whereby he learns to associate the letter cards 24 with the matching letter base support, which in this instance serves both as a teaching or guide card and base element. The letter cards 24 are provided with a central depending peg and an eyelet at the top for the same aforesaid reasons. Letter card 25 is shown with a pair of pegs 26 which may be inserted into an adjacent pair of peg holes as shown. The letter cards also lend themselves to be used with the other supports or pegboard tables as well.

In FIG. 8 the embodiment D is merely representative of one of the several numerals ranging from 0-9, the number "2" having been illustrated. The same teaching or learning concept prevails for this as in those described for FIGS. 6 and 7.

FIGS. 9 and 10 are illustrative of other lesson aids comprising combination pegboard guide bases and supports with the attendant design cards being of a corresponding shape. The back side of these design cards or symbols also preferably contain the appropriate brief definition etc. thereon.

FIG. 12 is representative of a lesson aid having preferably full three dimensional characteristics, and as shown the "APPLE" 27 is provided with a depending peg 28 and an eyelet 30. The name may be printed or embossed across one side thereof to serve as a teaching member. It is understood that suitable smaller design members or letter cards with individual letters and an apple design provided thereon are to be available in the central supply area to enable the student to select and pick the letters and to display them on the pegboard base, such as that designated 10 in FIG. 1, or one having an apple shape, more in accordance with the concept shown in FIGS. 6-10 inclusive. The design members may be smaller three-dimensional statuettes or may be of the more nearly two-dimensional relatively flat card form. It is to be further understood that the relatively flat card forms may be flat on their back faces and embossed or shaped into pronounced three-dimensional characters on the front face thereof, much as illustrated by the various cards shown in FIGS. 15, 16, and 17.

While the foregoing embodiments have concerned themselves primarily with the English language, an important facet of the invention is to provide lesson aids which will teach a plurality of languages. This concept will now be described in conjunction with the illustrative drawing FIGS. 13 and 14.

FIG. 13 is representative of a perspective view of a guide teaching card 34 having suitable indicia thereon to be learned. The selected example is of the word "HAT" spelled out in English as at 36. A pictorial representation of a man's hat is indicated at 38. Along the lower margin of the card may be provided one or more foreign language words corresponding to the English word. For example, in FIG. 13, the Spanish and French equivalents of the word are designated generally as at 40, with the initial S for "Spanish" and F for "French" being designated as at 42 near one margin opposite the corresponding words.

FIG. 14 further illustrates the progressive Spanish and French spelling of the word "HAT" as the design cards 44 bearing the correct English letter spelling are selectively positioned upon a pegboard base 46 shown in broken outline. The same S and F initials are preferably provided on the design or letter cards as shown, in the same general area corresponding to that at 42 of the guide card 34 and for the same reason. Again the guide and design cards 34 and 44 are provided with the usual peg and ring.

It is apparent that this novel game and teaching aid lends itself readily to teaching all letters, numbers, vocabulary, music, art as well as many other subjects and topics including the various forms and species of trees, flowers, vegetables, flags, and costumes of all nations.

FIGS. 18 and 19 are illustrative of a guide card 48 having a simple arithmetic addition problem 50 designated thereon and a plurality of design or number cards 52 respectively for teaching and solving problems related to simple addition of numbers. It is apparent that the other mathematical operations of subtraction, multiplication, and division may be similarly provided for.

FIG. 20 is representative of a guide card 54 which may be of any configuration such as round, square, rectangular, etc. and is provided with a simple phrase or sentence structure 56 in the form of a question. The students utilize the individual word cards 58, 60, 62 and the punctuation mark, a question mark, card 64, as displayed in FIG. 21 to learn to compose the sentence.

A manner of learning a combined form of geography and/or current affairs may be readily achieved by the provision of two or more of my Pixx game cards having related subject matter indicia provided on the respective cards which are adapted to be matched with one another. FIGS. 22 and 23 are representative of such an exercise, wherein FIG. 22 depicts a picture of a capitol building of a particular country and FIG. 23 depicts the corresponding president or other well known figurehead of that country. Matching or related cards would have like identifying numbers on the back side thereof together with a brief description and/or history relative to the subject matter appearing thereon, as on the back side of the guide cards as described in conjunction with other forms of the invention.

It is to be understood that famous works of art and their painters; famous literary compositions and their authors; uniforms or native costumes and national flags; periods of history and their related furniture and/or mode of dress; states and their better known commercial or agricultural products, etc. and ad infinitum, may be readily learned by advanced students utilizing the game material as presented on my novel guide and design cards in combination with my pegboards. A player's or student's score is preferably recorded on a suitable score card depicted in FIG. 34, with the surface thereof being readily erasable or washable for repeated use.

In accordance with one of the proposed teachings of the preceding paragraph, FIG. 24 is illustrative of the use of a plurality of related lesson-aid cards and their supports designated generally en masse by the letter H. It comprises a plurality of progressively sized base supports 70, 72, and 74 having a plurality of aligned apertures 76 as shown. The supports may be arranged in step fashion as shown, or may be used individually as will be observed in FIGS. 32 and 33. The series of related pictorial guide and design cards are indicated at 78, 80 and 82 and represent the flag of Holland, a Dutch girl in native costume, and the country's flower, a tulip, respectively. While the said cards are shown each disposed on a separate support base, it is apparent that the same objective of conveying learning by matching the appropriate related cards can be achieved by displaying them all on a single support. The card 78 depicting the country's national flag may be considered the guide card having a brief description or history data on the back side thereof, while the other cards 80 and 82 may be considered the design cards, and may or may not have additional indicia information thereon.

Proceeding to the embodiments J and K as depicted in FIGS. 26–30, a modified form of relatively small work table 81 comprises a pegboard top 82 disposed upon a suitable rectangular frame preferably embodying a recessed card storage trough 84 at opposite side margins thereof. A card storage drawer 86 also may be provided if desired in conjunction therewith to receive the guide cards and the like, while the letter or design cards may be arranged in either or both of the said troughs 84. An elongated slot 88 is also provided adjacent the top margin thereof intermediate the side troughs 84, to receive a mounting tab 90 of the exemplary dog-shaped guide card 92 or the lower portion 94 of a sun-shaped guide card 96 as shown in FIGS. 28 and 29 respectively. The guide cards are also provided with the usual peg at the lower portion to enable it to be mounted in one of the apertures of the slotted pegboard, as well as having a ring on the upper portion for hanging same on a storage rack or suitable display panel. Table 80 is additionally provided preferably with four removable supporting legs 97 at the corners thereof. These may be removed and the table used without them as shown in FIGS. 30 and 31. It is contemplated that a rigid card or panel (not shown) having a plurality of hooks on one face, and having a tab or peg base may be mounted on the table to provide means for displaying the design or letter playing cards for study purposes.

FIG. 27 is representative of a lesson-aid indicia-bearing panel 98 having suitable apertures 100 as at the corners thereof to enable the same to be applied to a table, such as 80 (FIG. 26), as by registering the openings 100 in alignment with and by placement upon suitable pegs 102. The panels 98 may contain a large variety of indicia material on one or both sides to be taught, with the panel of FIG. 27 displaying various letter and number indicia whereas that of FIG. 30 displays a picture of the "SUN" together with the word spelled out both in capital and small case letters.

It may be desirable also to provide the alphabet letters and number 1–0 on the face edge 104 of the tables 80a in FIGS. 30 and 31, either in a plain or an embossed manner.

Still other forms of lesson aids are depicted at L or M in FIGS. 32 and 33 respectively. The L aid is primarily intended to teach only two-letter words, and accordingly the support table and guide 110 may be fabricated of a short rectangular block of material or in the inverted U-shape or channel form as shown, having only two peg holes 112. The upper surface 114 thereof is preferably provided with imprinted two letter words, such as "AT" and "at" in both capital and small case letters. Alternately, the surface 114 may be of a character which will removably receive pencil or crayon markings which can be readily washed away to permit different letter and/or number characters to be applied thereto. This will lessen the requirement for so many of the supports 110 having the pre-printed or pre-formed indicia characters thereon. In use the student studies the indicia markings and the cut-out letter characters, such as 116 and 118, which are available to him from the central supply source, and upon correctly matching the cut-out letters to those on the guide table 110, he proceeds to place them by their peg in the corresponding peg hole.

FIG. 33 is illustrative of generally the same concept as that of FIG. 32, but relates to three-letter words. Additionally, the combined guide-support 120, which may be fabricated similar to that of 110, may be provided with either an integrally formed or removable press-fit statuette 122 along one edge thereof, preferably spaced from the longitudinally aligned peg receiving apertures 124. The exemplary statuette of FIG. 33 is representative of a dog and the said name may be imprinted or embossed upon the statuette or on the front face 126 of support 120, the latter method being shown. The hidden face opposite that of 126 may be provided with descriptive teaching indicia or brief history pertaining to the item, article or the like being learned about. The student utilizes this form in the same general manner as the others, by studying the object 122, its name associated therewith, and the related cut-out spelling characters, whereupon the appropriate characters, such as the "D" designated at 128, are chosen and inserted into the appropriate peg holes 124.

It is to be understood that the same general form of combined guide and support may be utilized to teach the mathematical or other operations already mentioned hereinbefore.

Accordingly, it is apparent from the foregoing that the game playing or lesson-aid components herein disclosed, when used in the manner outlined, tend to stimulate the thinking and acting processes since the players must first repeatedly observe or review the problem, memorize the indicia appearing upon the guide card or combined guide card and support base, and then repeatedly attempt to mentally and physically solve a given problem, construct a given sentence or learn a particular word, phrase or concept in the shortest possible time, by mounting the selected pegged characters in their proper order upon the related support member.

It is further apparent that a novel and improved teaching aid has been evolved which achieves all of the objects and advantages as set forth in the preamble and throughout the specification. Various changes in size, shape and arrangement of the component elements including the rings may be made without departing from the spirit of the invention and reference should be made to the appended claims for a definition of the inventive scope of the invention.

I claim:

1. The educational and recreational lesson-aid game for graphically conveying an educational concept comprising in combination:
    (a) a teaching aid member including means to convey by visual perception a concept to be taught, together with a series of concept identifying characters,
    (b) said teaching aid member having support means which in cooperation with cooperative supporting structure may support the teaching aid member in an upright position for visual inspection,
    (c) plural playing members each being provided with the same visual concept conveying means as that embodied in the teaching aid member to convey by visual perception the concept to be taught,
    (d) the playing members being provided with similar support means and a visual display of at least one of the concept-identifying characters in said series of concept identifying characters on said teaching aid member, and (e) cooperative support means for said teaching aid member and said playing members dimensioned and arranged so that said teaching aid member and said playing members may be mounted on said support in an upright position and in predetermined juxtaposed relation, with the playing members arranged so that the respective concept-identifying characters thereon are in the same sequence as are the concept-identifying characters on the teaching aid member, the teaching aid member being of pronounced three-dimensional character and including external physical contours which characterize said concept.

2. The lesson-aid game as defined in claim 1 wherein the corresponding playing members are also of pronounced three-dimensional character and include external physical contours which characterize the concept.

3. The educational and recreational lesson-aid game for graphically conveying an educational concept comprising in combination:

(a) a teaching aid member including means to convey by visual perception a concept to be taught, together with a series of concept identifying characters, (b) said teaching aid member having support means which in cooperation with cooperative supporting structure may support the teaching aid member in an upright position for visual inspection, (c) plural playing members each being provided with the same visual concept conveying means as that embodied in the teaching aid member to convey by visual perception the concept to be taught, (d) the playing members being provided with similar support means and a visual display of at least one of the concept-identifying characters in said series of concept identifying characters on said teaching aid member, (e) cooperative support means for said teaching aid member and said playing members dimensioned and arranged so that said teaching aid member and said playing members may be mounted on said support in an upright position and in predetermined juxtaposed relation, with the playing members arranged so that the respective concept-identifying characters thereon are in the same sequence as are the concept-identifying characters on the teaching aid member, (f) said cooperative support means including means provided with a plurality of peg-receiving apertures, and (g) said support means on the teaching aid member and on the playing members being peg members dimensioned to fit snugly within an aperture in said cooperative support means.

4. An educational game apparatus comprising in combination support means including a generally horizontal exposed upper surface having plural peg-receiving apertures therein, lesson-aid teaching means including a lesson-aid panel member bearing concept teaching indicia on at least one face thereof and having aperture means disposed therein to align with predetermined apertures in said exposed surface when the panel member is superposed thereon, peg means dimensioned to fit within the aligned apertures in the panel member and in the exposed surface to removably retain the panel member in position on said surface, said support means including an upwardly open elongated slot disposed adjacent one edge of said apertured surface, a display member having means dimensioned to fit within said slot for supporting the display member in upstanding relation to a panel member supported on said exposed surface, said display member carrying indicia thereon relevant to the concept teaching indicia on said panel.

5. The educational and recreational lesson-aid game for graphically conveying an educational concept comprising in combination a plurality of game pieces each carrying display means designed to convey to an observer by visual perception a desired concept, first and second support means remotely located with respect to each other for selectively supporting said game pieces in substantially upright position for viewing, said first support means including storage rack means for said game pieces, said storage rack means and said game pieces carrying cooperative means for mounting the game pieces on said storage rack means in upright position for inspection and comparison, said second support means including a base member having an exposed surface thereof provided with means cooperable with cooperative means carried by said game pieces for mounting game pieces selected from said storage rack means on said base member in upright position and in predetermined relation with respect to the display means on said game pieces, the said cooperative mounting means carried by the game pieces for mounting the same on said first and second support means being disposed respectively at upper and lower opposite end portions of the game pieces with the mounting means at one of the corresponding ends of the respective game pieces being disposed and arranged for operative cooperation with one only of said remotely located support means and with the mounting means at the other of said corresponding ends of the respective game pieces being disposed and arranged for operative cooperation with the other of said support means only whereby each of said mounting means is mutually exclusive in relation to the other of said mounting means.

6. The game apparatus as defined in claim 5 wherein the mounting means at the upper end portions of said game pieces is in the form of a ring member and the mounting means at the lower end portions thereof is a peg member, and wherein the mounting means on said storage rack means includes projecting members dimensioned to supportingly engage said ring members of said game pieces and wherein the mounting means on said base member includes peg-receiving apertures dimensioned to receive said peg members on said game pieces.

7. The game apparatus as defined in claim 6 wherein the second support means includes a plurality of alphabetical letter-shaped bases and the game pieces are also of letter shape of the same shape and form as are the letter-shaped bases.

8. The game apparatus as defined in claim 6 wherein:

(a) the support means includes a plurality of elongated bases of generally rectangular cross-sectional contour and each having a generally horizontally disposed peg-receiving surface in which the peg-receiving apertures are arranged in longitudinally-extending upwardly-opening rows, (b) said bases being of progressively different heights to provide selective stepped disposition of the respective peg-receiving surfaces when a plurality of said bases are arranged in side-by-side parallel relation.

9. The apparatus as defined in claim 8 wherein:

(a) the bases each have at least two angular disposed surfaces which are visible during play of the game, and (b) supplementary lesson-aid indicia provided on at least one of said surfaces.

10. The apparatus as defined in claim 9 wherein the stands include a three-dimensional lesson-aid object unitarily formed therewith.

11. In an educational and recreational lesson-aid game apparatus including game peices and plural support means on which said game pieces may be mounted in upright position for inspection and study, and the respective support means each includes game piece mounting structure, with the game piece mounting structure on each support means having like structural features but with the like structural features of the game piece mounting structure on one of said support means being structurally different than the game piece mounting structure on the other of said support means, the improvement comprising:
  (a) mounting means on one common end of each of said game pieces dimensioned and arranged for cooperative association with the game piece mounting structure on one only of said support means, and
  (b) additional mounting means on an opposite end of each of said game pieces dimensioned and arranged for cooperative association with the game piece mounting structure on the other of said support means only, wherein the mounting means on opposite ends of said game pieces are mutually exclusive as to the game piece mounting structure on the respective support means.

12. The educational and recreational lesson-aid game apparatus described in claim 11 wherein the first-mentioned mounting means is in the form of a ring member designed to cooperate with a projecting arm on one of said support means and wherein the second-mentioned mounting means is in the form of a peg member designed to cooperate with apertures provided in an exposed surface of the other of said support means.

References Cited

UNITED STATES PATENTS

| | | | |
|---|---|---|---|
| D. 126,969 | 5/1941 | Wilson. | |
| D. 134,602 | 12/1942 | Bruheim | D34—5 X |
| D. 160,691 | 10/1950 | Carr | D34—5 |
| 1,009,421 | 11/1911 | Lankler | 35—35 |
| 1,084,370 | 1/1914 | Smith | 35—73 X |
| 1,151,279 | 8/1915 | Lewis | 35—73 |
| 1,241,009 | 9/1917 | Pajeau | 35—71 |
| 1,343,721 | 6/1920 | Herrmann | 35—73 |
| 1,392,726 | 10/1921 | Watkins | 35—60 |
| 1,563,582 | 12/1925 | McDade | 35—73 X |
| 1,974,838 | 9/1934 | Schmid | D34—18.2 X |
| 2,424,169 | 7/1947 | Hoffman | 35—35 |
| 2,474,447 | 6/1949 | Wheelock | 35—73 |
| 2,482,227 | 9/1949 | Towne | 35—31 X |
| 2,958,961 | 11/1960 | Wheeler | 35—73 |
| 3,081,560 | 3/1963 | Agud | 35—71 X |
| 3,190,603 | 6/1965 | Finnemann. | |
| 3,270,430 | 9/1966 | Hurst | 35—35 |
| 793,676 | 7/1905 | Olivera | 35—73 |
| 968,513 | 8/1910 | Wynne-Jones | 35—73 X |
| 2,871,619 | 2/1959 | Walters | 35—16 X |
| 3,159,403 | 12/1964 | Glass et al. | 35—71 X |
| 3,263,347 | 8/1966 | McCutcheon | 35—73 X |

FOREIGN PATENTS 101,355 9/1916 Great Britain.
30,264 7/1933 Netherlands.

EUGENE R. CAPOZIO, Primary Examiner
HARLAND S. SKOGQUIST, Assistant Examiner

U.S. Cl. X.R.

35—60